R. E. HASEMEIER.
SHOCK ABSORBER FOR VEHICLES.
APPLICATION FILED DEC. 4, 1920.
1,421,223.
Patented June 27, 1922.
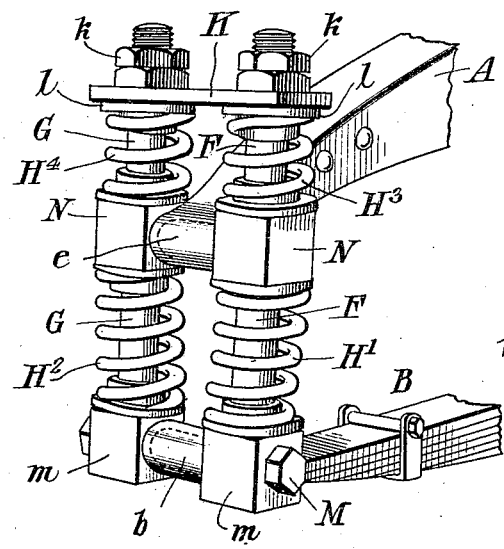
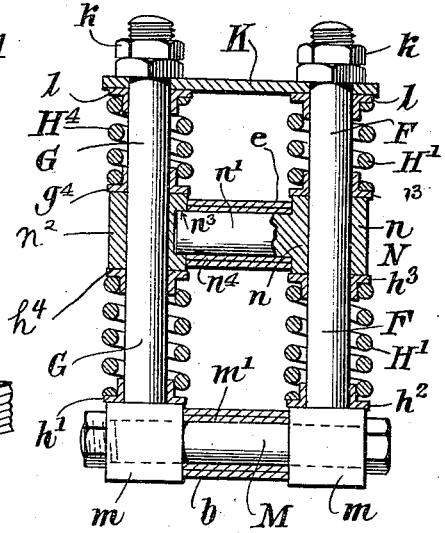
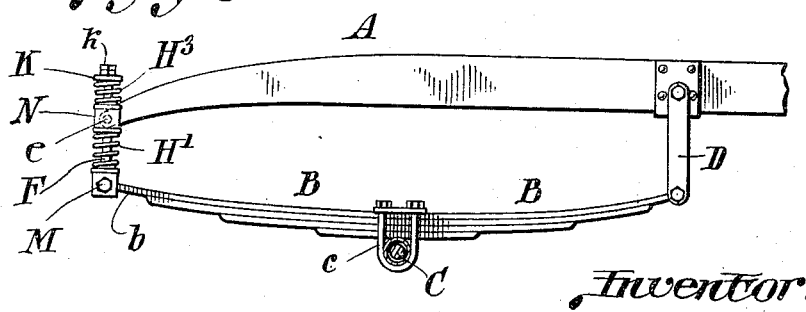
Inventor:
R. E. Hasemeier;
by his Attorneys

UNITED STATES PATENT OFFICE.

RALPH E. HASEMEIER, OF SHREVEPORT, LOUISIANA.

SHOCK ABSORBER FOR VEHICLES.

1,421,223.                Specification of Letters Patent.    Patented June 27, 1922.

Application filed December 4, 1920. Serial No. 428,315.

*To all whom it may concern:*

Be it known that I, RALPH E. HASEMEIER, a citizen of the United States, residing in Shreveport, in the parish of Caddo and State of Louisiana, have invented certain new and useful Improvements in Shock Absorbers for Vehicles, of which the following is a specification.

This invention relates to devices for absorbing or relieving shocks incident to spring supported vehicles, such as automobiles, in which the vehicle body is supported on springs which in a measure provide easy riding, but which, when the vehicle encounters obstructions in the road, are suddenly compressed or expanded and produce such shocks as to cause discomfort to the occupants of the vehicle. According to my invention I associate with the usual vehicle springs yielding devices which to a very great extent relieve such shocks, and these devices are simple in construction, reliable in operation and can be easily applied to vehicle supporting springs of various kinds.

In carrying out my invention I provide a frame comprising vertical posts which are connected and held apart at their lower ends and are also connected and held apart at their upper ends. The posts are likewise connected between their upper and lower ends and coiled springs are carried by the posts between their upper ends and their intermediate connection and also between this intermediate connection and the lower ends of the posts. The lower ends of the posts are pivotally connected with a portion of the vehicle supporting spring and the intermediate portions of the posts are connected with another portion of these springs or with the chassis of the vehicle. The connection between the lower ends of the posts and the springs is a pivotal one, as is also the connection between the intermediate portion of the posts and the supporting springs or chassis of the vehicle. The effect of this construction is to largely reduce or absorb shocks to which the vehicle is subjected.

An important feature of the invention is the means employed for pivotally connecting the rear end of a supporting spring with the shock absorber and also pivotally connecting the rear end of the vehicle frame or a spring projecting therefrom with another part of the shock absorber, the arrangement being such that the shock absorber may be tilted or swung on a pivotal connection while in operation.

My improvements are illustrated in the accompanying drawings, in which—

Figure 1 is a perspective view of my invention applied to the chassis and a rear supporting spring of an automobile.

Figure 2 is a view in vertical section of my improved shock absorber.

Figure 3 is a side view showing the way of applying my improvements to a vehicle supporting spring.

In the drawing I have shown the invention applied to one of the rear springs of an automobile of well known construction. A part of the chassis of the vehicle is shown at A, and B indicates a leaf spring. The spring B is connected in well known ways to the axle C at $c$ and the front end of the spring is suspended from the chassis by a link D.

The supporting spring B is connected with the axle C at $c$ and one end of the spring is suspended from the chassis by a link D. The end of the chassis A is connected with a shock absorber and the outer end of the spring B is directly connected with the absorber.

It will be observed that there are two vertical posts F and G spaced apart and carrying four springs $H'$, $H^2$, $H^3$, $H^4$. The posts are connected at their upper ends and spaced apart by a plate K, and the upper ends of the posts carry nuts $k$ which bear on the plate K. The upper ends of the springs $H^3$ and $H^4$ are received by thimbles $l$ which in turn bear on the under side of the plate K. The lower ends of the posts are formed with enlargements or blocks $m$ between which is interposed a bushing or sleeve $m'$ which holds the posts a suitable distance apart and these blocks or enlargements are connected by a bolt M. The rear end $b$ of the spring B is connected with the bolt M or the bushing $m'$ and this connection is a pivotal one so that when the spring B is compressed or relaxed there is some freedom of movement to avoid strain. The posts F and G are connected intermediate their upper and lower ends by a floating member N comprising a part consisting of a block $n$ through which one of the posts extends and which is provided with an arm $n'$ and a part $n^2$ consisting of a block through which the other post extends and which is formed with a recess $n^3$ into which the outer end of the arm $n'$ projects. A sleeve or bushing $n^4$ surrounds the arm $n'$. Normally the intermediate member N is arranged midway between the upper and lower ends of the posts. The lower springs $H'$, $H^2$ have their lower ends seated in thimbles $h'$, $h^2$ resting on the blocks $m$ and the upper ends of these lower springs receive thimbles $h^3$, $h^4$ which bear on the lower sides of the blocks $n$, $n^2$. The upper springs $H^3$, $H^4$ rest on their lower ends on thimbles $q^3$, $q^4$ which in turn rest on the top of the blocks $n$ and $n^2$.

The rear end $b$ of the spring B is pivotally connected with the lower part of the device, while the rear end of the chassis A is pivotally connected at $e$ with the intermediate member N.

When the spring B is compressed, its rear portion straightens, its rear end moving rearwards with the lower ends of the posts F and G which latter pivot on the intermediate member N. The springs $H^3$, $H^4$ are at this time put under compression. When the vehicle body tends to drop, the springs $H'$, $H^2$ are put under compression and transmit motion to the main supporting spring B. When the vehicle body tends to rebound, the upper springs $H^3$, $H^4$ are compressed. Thus the up and down movement on the vehicle and the movement of the outer end of the supporting spring is cushioned at all times and the fact that the absorber as a whole has a pivotal connection with the chassis is an element of importance.

Actual experience has demonstrated that a shock absorber constructed in this way acts most efficiently.

The tension of the four springs may be regulated and adjusted by the nuts $k$ so that the proper degree of compression may be given to the four springs in order to obtain the best results.

It is obvious that my improvements may be applied to other forms of supporting springs without modifications, or with very slight modifications.

I claim as my invention:

1. The combination with the frame of a vehicle of an axle, a spring supported on the axle and link-connected at one end with the frame, and a shock absorber comprising two vertical posts spaced apart and having cross-pieces connecting them at their upper and lower ends, an intermediate floating cross-piece, springs on the posts both above and below said intermediate cross-piece and which bear on the upper and lower cross-pieces, and pivotal connections between the axle-supported spring, the vehicle frame and the shock absorber, said connections being pivoted to the floating cross-piece between the upper and lower springs carried by the posts and to the lower cross-piece below the lower post springs.

2. The combination with the frame of a vehicle of an axle, a spring supported on the axle and link-connected at one end with the frame, and a shock absorber comprising two vertical posts spaced apart and having cross-pieces connecting them at their upper and lower ends, an intermediate floating cross-piece, springs on the posts both above and below said intermediate cross-piece and which bear on the upper and lower cross-pieces, a pivotal connection between the axle-supported spring and the lower cross-piece, and a pivotal connection between the vehicle frame and the floating cross-piece.

In testimony whereof, I have hereunto subscribed my name.

RALPH E. HASEMEIER.